United States Patent [19]

Keil et al.

[11] Patent Number: 4,552,905
[45] Date of Patent: Nov. 12, 1985

[54] COPOLYMER, A PROCESS FOR ITS PREPARATION AND ITS USE AS A SORBENT

[75] Inventors: Karl-Heinz Keil, Hanau-Mittelbuchen; Ulrich Greiner, Schöneck; Fritz Engelhardt, Frankfurt am Main; Klaus Kühlein, Kelkheim; Reinhold Keller, Bad Soden; Merten Schlingmann, Königstein, all of Fed. Rep. of Germany

[73] Assignee: Cassella Aktiengesellschaft, Frankfurt am Main, Fed. Rep. of Germany

[21] Appl. No.: 623,707

[22] Filed: Jun. 22, 1984

[30] Foreign Application Priority Data

Jul. 9, 1983 [DE] Fed. Rep. of Germany ....... 3324834

[51] Int. Cl.[4] .................................................. C08J 9/00
[52] U.S. Cl. ..................................... 521/149; 521/150; 521/152; 521/154
[58] Field of Search ................ 521/149, 150, 154, 152

[56] References Cited

U.S. PATENT DOCUMENTS

| | | |
|---|---|---|
| 3,681,269 | 8/1972 | Heitz et al. ............................ 521/149 |
| 3,817,745 | 6/1974 | Copes et al. . | 
| 3,878,175 | 4/1975 | Steckler ................................ 521/149 |
| 3,886,125 | 5/1975 | Chromecek ........................... 521/149 |
| 4,154,910 | 5/1979 | Tanaka et al. ....................... 521/149 |
| 4,246,351 | 1/1981 | Mijake et al. ........................ 521/149 |
| 4,246,362 | 1/1981 | Sasaki et al. ......................... 521/149 |
| 4,251,634 | 2/1981 | Coupek et al. ....................... 521/149 |
| 4,281,233 | 7/1981 | Coupek et al. ....................... 521/149 |

FOREIGN PATENT DOCUMENTS 3043766 1/1955 Fed. Rep. of Germany .

Primary Examiner—Morton Foelak
Attorney, Agent, or Firm—Connolly and Hutz

[57] ABSTRACT

The crosslinked copolymer containing 75 to 99.9% by weight of recurring units of a pyridyl, quinolyl, isoquinolyl or pyrazinyl compound containing a polymerizable olefinic group, 0.1 to 25% by weight of units of a crosslinking agent and 0 to 25% by a weight of units of a polymerizable organosilicon and/or organoboron compound and, based on 100% by weight of the sum of the abovementioned units, 5 to 350% by weight of units of an N-vinyl-amide, is prepared by bead polymerization and used as a sorbent for acid substances from their aqueous solutions.

11 Claims, No Drawings

COPOLYMER, A PROCESS FOR ITS PREPARATION AND ITS USE AS A SORBENT

The present invention relates to a crosslinked, porous bead-like copolymer, a process for its preparation and its use as a sorbent, in particular for removing acid substances from solvents.

The removal of carboxylic acids and mineral acids from solvents is becoming increasingly more important in industry. This removal can be effected with exchanger resins. Thus, Japanese patent specification No. 24,561/1971 describes a process for removing carboxylic acids using basic anion exchangers of the styrene type. The amount of sorbed carboxylic acid is only small in this process, and in addition the desorption must be carried out with acetone and carbon dioxide gas under a pressure of 0.5 to 20 bar, which requires considerable expenditure, especially on a large industrial scale.

A process for isolating carboxylic acids from an aqueous solution is known from German Pat. No. C2-3,043,766, in which a crosslinked polymeric compound having a pyridine skeleton structure is used as the sorbent. Divinylbenzene, divinyl phthalate and ethylene glycol diacrylate are mentioned as crosslinking agents. An aliphatic alcohol, a ketone or a carboxylic acid ester is used for the desorption. However, the capacity of the sorbent used is still too low, and in addition the sorbent swells too greatly, so that the flow resistance or the flow time increases.

It has now been found, surprisingly, that the copolymer according to the invention has a high sorption capacity for acid substances and a low swelling capacity. The crosslinked porous, beadlike copolymer according to the invention contains 75 to 99% by weight of recurring units of a pyridyl, quinolyl, isoquinolyl or pyrazinyl compound containing a polymerisable olefinic group or of several such compounds, 0.1 to 25% by weight of units of an n-valent crosslinking agent or of several n-valent crosslinking agents and 0 to 25% by weight of units of a polymerisable organosilicon and/or organoboron compound or of several such compounds and, based on 100% by weight of the sum of the abovementioned units, 5 to 350% by weight of units of an N-vinyl-amide of the general formula I $CH_2=CH-N(R^1)-C(R^2)=0$, wherein $R^1$ denotes hydrogen, methyl or ethyl and $R^2$ denotes hydrogen or $(C_1-C_3)$-alkyl, or of several such N-vinyl-amides, and 0 to 40% by weight of units of another polymerisable compound or of several such compounds, n being a number equal to or greater than 2 and it being possible for the pyridyl, quinolyl, isoquinolyl or pyrazinyl compound also additionally to have one other or several other substituents.

Besides hydrogen, $R^2$ can denote methyl, ethyl, propyl or isopropyl. Preferably, $R^1$ and $R^2$ independently of one another denote hydrogen or methyl.

In many cases, the copolymer contains, based on 100% by weight of units of the polymerisable heterocyclic compounds, units of the crosslinking agents and any units present of polymerisable organoboron and/or organosilicon compounds, advantageously only 0 to 25% by weight of units of other polymerisable compounds, instead of 0 to 40% by weight of units of other polymerisable compounds. Based on the already mentioned 100% by weight of units of polymerisable heterocyclic compounds, of crosslinking agents and of any organoborn and/or organosilicon compounds present, the copolymer can contain, for example, 10 to 40% by weight, preferably 10 to 110%˙by weight and particularly preferably 10 to 250% by weight of units of one or more N-vinyl-amides of the general formula I.

The copolymer according to the invention preferably contains 80 to 99% by weight of units of a pyridyl, quinolyl, isoquinolyl or pyrazinyl compound containing a polymerisable olefinic group or of several such compounds, 1 to 20% by weight of units of an n-valent crosslinking agent or of several n-valent crosslinking agents, and 0 to 19% by weight of units of a polymerisable organosilicon and/or organoboron compound or of several such compounds, and, based on 100% by weight of the sum of the abovementioned units, 10 to 250% by weight of units of an N-vinyl-amide of the general formula I or of several such N-vinyl-amides, and 0 to 25% by weight of units of another polymerisable compound or several such compounds, n having the meaning already given and it being possible for the pyridyl, quinolyl, isoquinolyl or pyrazinyl compound also additionally to have one other or several other substituents.

Those copolymers according to the invention which contain at least 0.1% by weight, preferably 0.1 to 10% by weight, of units of polymerisable organosilicon and-/or organoboron compounds are also particularly preferred, especially if these compounds act as units of n-valent crosslinking agents.

Those copolymers according to the invention which contain no units of other polymerisable compounds are also preferred.

The copolymer according to the invention contains units of a pyridyl, quinolyl, isoquinolyl or pyrazinyl compound containing a polymerisable olefinic group or of several such compounds, and furthermore units of one or more crosslinking agents and units of one or more N-vinyl-amides. If appropriate, the copolymer according to the invention can furthermore contain units of one or more polymerisable organosilicon and-/or organoboron compounds and units of one or more other polymerisable compounds. Units here are understood as meaning the groups, randomly distributed in the copolymer, which are formed from the polymerisable monomeric compounds used for the preparation of the copolymer.

The polymerisable olefinic group of the pyridyl, quinolyl, isoquinolyl or pyrazinyl compound is as a rule bonded directly, but if appropriate also indirectly, for example via an oxygen or sulphur atom, to the nucleus and usually has the formula II $$-(CH_2)_m-C(R^3)=C(R^4)H \qquad (II)$$

wherein $R^3$ and $R^4$ independently of one another denote hydrogen or $(C_1-C_4)$alkyl and m denotes a number from 0 to 4. The combination of $H/CH_3$ or $CH_{3/H,\ or\ H/H}$ is preferred for the radicals $R^3$ and $R^4$. m is preferably 1 or, particularly preferably, 0.

If the pyridyl, quinolyl, isoquinolyl or pyrazinyl compound containing a polymerisable olefinic group contains further substituents, it carries, in particular, one, two or three $(C_1-C_4)$alkyl and/or OH substituents. The alkyl substituents can be straight-chain or branched, as can the alkyl radicals $R^3$ and $R^4$. The pyridyl, quinolyl, isoquinolyl or pyrazinyl compound containing a polymerisable olefinic group is substituted, in particular, by one or two alkyl radicals or by one OH group or by one OH group and one alkyl radical.

The recurring units, contained in the copolyer according to the invention, of the pyridyl, quinolyl, isoquinilyl or pyrazinyl compound containing a polymerisable olefinic group thus usually have the formula III

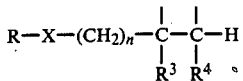  (III)

wherein R denotes pyridyl, quinolyl, isoquinolyl or pyrazinyl, $R^3$ and $R^4$ denote hydrogen or $(C_1-C_4)$alkyl and X denotes —O—, —S— or —$(CH_2)_m$—, where m denotes a number from 0 to 4, preferably 1 or, in particular, 0, X thus denotes, in particular, a direct bond, and the radical R can also be mono- or poly-substituted, in particular by $(C_1-C_4)$alkyl and/or OH groups. The preferred possible alkyl substituent for R is methyl or ethyl. The radicals R and/or $R^3$ and/or $R^4$ can be identical or different in the recurring units of the formula III in the copolymer. Polymerisable olefinic groups are, in particular, the vinyl, allyl, methallyl or isopropenyl group.

Suitable examples of a pyridyl, quinolyl, isoquinolyl or pyrazinyl compound containing a polymerisable olefinic group are: 2-vinyl-pyridine, 3-vinyl-pyridine, 4-vinyl-pyridine, 3-isopropenyl-pyridine, 2-vinyl-5-methyl-pyridine, 2-methyl-5-vinyl-pyridine, 3-methyl-5-vinyl-pyridine, 2,4-dimethyl-6-vinyl-pyridine, 3-methyl-4-vinyl-pyridine, 3-ethyl-4-vinyl-pyridine, 3-methyl-2-vinyl-pyridine, 3-ethyl-2-vinyl-pyridine, 4-methyl-4-vinyl-quinoline, 2-methyl-5-vinyl-quinoline, 1-methyl-5-vinyl-isoquinoline, 2-isopropenyl-quinoline, 2-vinyl-pyrazine, 2-vinyl-5-ethyl-pyridine, 2-vinyl-4,6-dimethyl-pyridine, 2-vinyl-quinoline and 2-methyl-3-vinyl-8-hydroxy-quinoline. Of the pyridyl, quinolyl, isoquinolyl or pyrazinyl compounds, the pyridyl compounds, especially the vinyl-pyridine compounds and in particular 4-vinyl-pyridine, are preferred.

Up to 50% by weight of the units, contained in the copolymer, of a pyridyl, quinolyl, isoquinolyl or pyrazinyl compound containing a polymerisable olefinic group can be replaced by units of a heterocyclic 5-membered ring compound which contains a polymerisable olefinic group and has at least one protonatable nitrogen atom in the ring, or of several such compounds. The same statements apply to the polymerisable olefinic group of the heterocyclic 5-membered ring compound mentioned as to the polymerisable olefinic group of the pyridyl, quinolyl, isoquinolyl or pyrazinyl compound. The heterocyclic 5-membered ring compound can contain, for example, one, two, three or four nitrogen atoms, at least one of which must be protonatable it also being possible for the heterocyclic ring optionally additionally to contain another hetero-atom or several other hetero-atoms, in particular oxygen and/or sulphur. Protonatable nitrogen atoms are basic nitrogen atoms with a free electron pair, which are incorporated in the 5-membered ring as, for example, —N=, —NH— or

—N—.
 |

Nitrogen atoms which, for example, are adjacent to a keto group no longer have basic properties and thus can no longer be protonated. The heterocyclic 5-membered ring can be saturated, partly saturated or unsaturated and can be, for example, an imidazole, imidazoline, oxazole, oxazoline, oxazolidine, thiazole, oxadiazole, pyrrole, triazole or tetrazole, and can optionally also contain one or more $(C_1-C_4)$alkyl and/or $(C_2-C_4)$hydroxyalkyl groups. Polymerisable olefinic groups are, in particular, the vinyl, allyl, methallyl or isopropenyl group. Examples which may be mentioned of a heterocyclic 5-membered ring compound which contains a polymerisable olefinic group and has at least one protonatable nitrogen atom in the ring are: 1-vinyl-1,2,3-triazole, 1-vinyl-1,2,4-triazole, 4-vinyl-1,2,3-triazole, 5-vinyl-1,2,3-triazole, 1-vinyl-1,2,3,4-tetrazole, 2-vinyl-1,2,3,4-tetrazole, 2-allyl-1,2,3,4-tetrazole, 1-allyl-1,2,3,4-tetrazole, 1-methyl-5-vinyl-1,2,3,4-tetrazole, 2-methyl-5-vinyl-1,2,3,4-tetrazole, 3-vinyl-1,2,4-oxadiazole, 3-vinyl-5-methyl-1,2,4-oxadiazole, 3-isopropenyl-1,2,4-oxadiazole, 2-isopropenyl-1,3,4-oxadiazolin-5-one, 3-isopropenyl-1,2,4-oxadiazole, 3-isopropenyl-5-methyl-1,2,4-oxadiazole, 2-vinyl-oxazoline, 2-vinyl-oxazoline, 2-isopropenyl-oxazoline, 2-vinyl-3-methyl-oxazolidine, 2-vinyl-thiazole, 4-vinyl-thiazole, 1-vinyl-2-imidazoline, 2-vinyl-4-(or 5-)-methyl-2-imidazoline, 1-vinyl-2-methyl-2-imidazoline, 1-vinyl-imidazole, 1-methyl-2-vinyl-imidazole, 1-vinyl-2-methyl-imidazole, 1-vinyl-4-(2-hydroxyethyl)-imidazole, N-vinyl-pyrrole, 2-isopropenyl-2-imidazoline, 2-vinyl-3-methyl-2-imidazoline and 1-vinyl-2,4-dimethyl-imidazole.

Of the heterocyclic 5-membered ring compounds which contain a polymerisable olefinic group and have at least one protonatable nitrogen atom in the ring, the vinyl-imidazoles, in particular 1-vinyl-imidazole, are preferred.

The crosslinking agent links n polymer chains with one another, n being a number equal to or greater than 2. In particular, n is 2,3 or 4, preferably 2.

Examples of suitable crosslinking agents are compounds which contain space polymerisable radicals, in particular of the formulae $CH_2=CH—$, $CH_2=CH—CH_2—$, $CH_2=CH(R^5)—CO—$ or $CH_2=CH(R^5)—CO—O—$, in the molecule, n having the meaning already given, and usually being 2, 3 or 4, preferably 2 or 3, and $R^5$ denoting hydrogen or $(C_1-C_4)$alkyl, in particular hydrogen or methyl. Examples of such crosslinking agents are: triallyl cyanurate, triallyl phosphate, N,N', N''-tris-acryloyl-perhydrotriazine, 1,2,3-trivinyloxypropane, tetraallyloxyethane, pentaallyl-sucrose, triallyl-amine, N,N',N''-tris-(2-acryloyloxyethyl- or -methacryloyloxyethyl) isocyanurate, diallyl ethenephosphonate, ethylene glycol 1,2-bis-(ethenephosphonate) and furthermore, generally, compounds of the formula IV, V or VI

  (IV)

  (V)

  (VI)

wherein $R^5$ has the meaning already given, n usually denotes 2, 3 or 4, preferably 2 or 3, $R^7$ represents the radical formed by removing n acid H atoms from a di-, tri-, tetra- or poly-carboxylic acid, $R^8$ represents the radical formed by removing n hydroxylhydrogen atoms from a di-, tri-, tetra- or poly-ol and $R^6$ represents the radical formed by removing n hydrogen atoms from an aliphatic, aromatic or heteroaromatic hydrocarbon.

Suitable crosslinking agents of the formula IV are divinylbenzenes, in particular 1,4-divinylbenzene, trivinylbenzenes, divinylpyridines and divinylquinolines.

Examples of suitable crosslinking agents of the formula V are triallyl tricarballylate, triallyl aconitate, triallyl citrate, triallyl trimesinate, triallyl trimellitate, diallyl oxalate, divinyl phthalate and diallyl maleate, fumarate, adipate or phthalate.

Examples of suitable crosslinking agents of the formula VI are trimethylolpropane tri-acrylate and -methacrylate, pentaerythritol tetra-acrylate and -methacrylate, pentaerythritol triacrylate and -methacrylate, dimethylene glycol diacrylate or dimethacrylate and butylene glycol diacrylate or dimethacrylate.

Examples of compounds of the general formula VI are the diacrylates and dimethacrylates of ethylene glycol, diethylene glycol and polyethylene glycols 200 to 600 and the dimethacrylates of polyethylene glycols 200 to 600.

Further examples of suitable crosslinking agents are diallylamine, divinyl ketone, divinylsulphone and diallylmelamine.

Surprisingly, water-soluble crosslinking agents, such as, for example, derivatives of acrylic or methacrylic acid, such as, for example, N,N'-methylene-bis-acrylamide, N,N'-methylene-bis-methacrylamide, N,N'-methylene-bis-(N-hydroxymethyl-methacrylamide), N,N'-bis-(methacryloyl)-aminoacetic acid, N,N'-bis-(acryloyl)-aminoacetic acid, 1,2-bis-(acrylamido)-1,2-dihydroxy-ethane, 1,2-bis-(methacrylamido)-1,2-dihydroxy-ethane, 1,2-bis-(N-hydroxymethyl-methacrylamido)-1,2-dihydroxy-ethane, 1,2-bis-(N-methoxymethyl-methacrylamido)-1,2-dimethoxy-ethane, 1,6-bis-(acrylamido)hexane, 1,6-bis-(methacrylamido)-hexane, 2-methyl-1,4-bis-(acrylamido)-butane ("isovalerilydene-bis-acrylamide"), 2-methyl-1,4-bis-(methacrylamido)-butane ("isovalerilydene-bis-methacrylamide") and diacrylates and dimethacrylates of ethylene glycol, diethylene glycol and polyglycols 200 to 600, in combination with the abovementioned crosslinking agents of the formulae IV, V and VI, can also be used.

Combinations of two or more crosslinking agents are also advantageous, for example of N,N'-methylene-bis-acrylamide/N,N-bis-(acryloyl)-aminoacetic acid; N,N'-methylene-bis-acrylamide/isovalerilydene-bis-acrylamide; and N,N'-methylene-bis-acrylamide/ethylene glycol 1,2-bis-(ethenephosphonate). Preferred crosslinking agent combinations can contain not only N,N'-methylene-bis-acrylamide and/or N,N'-methylene-bis-methacrylamide as a crosslinking agent component, but also the diacrylates and/or dimethacrylates of ethylene glycol, diethylene glycol or polyethylene glycols 200 to 600, or N,N',N"-tris-(2-acryloyloxyethyl) isocyanurate or N,N',N"-tris-(2-methacryloyloxyethyl) isocyanurate, trimethylolpropane triacrylate, trimethylolpropane trimethacrylate, pentaerythritol trimethacrylate, pentaerythritol triacrylate, butane-1,4-diol dimethacrylate,- butane-1,4-diol diacrylate, hexane-1,6-diol diacrylate and hexane-1,6-diol dimethacrylate with N,N'-methylene-bis-acrylamide and/or N,N'-methylene-bis-methacrylamide.

However, suitable n-valent crosslinking agents are also those compounds which contain only one or two polymerisable olefinic double bonds in the molecule but which, on the basis of secondary reactions, can additionally link (n-1) or (n-2) polymer chains with one another. Examples of such crosslinking agents are silanes containing alkoxy groups, in which the alkoxy groups are intermediately hydrlysed to Si—OH groups in an aqueous medium. Two silanol groups of this type then link two chains, by condensation and formation of a siloxane bond Si—O—Si. Examples of suitable crosslinking agents of this type are the organosilicon compounds described below, where these contain 1 or 2 olefinic double bonds and (n-1) or (n-2) alkoxy groups.

Examples of suitable N-vinyl-amides of the general formula I are N-vinyl-N-formamide, N-vinyl-acetamide, N-vinyl-N-methylacetamide, N-vinyl-N-methyl-formamide, N-vinyl-N-ethyl-acetamide, N-vinyl-propionamide, N-vinyl-N-methyl-propionamide, N-vinyl-N-ethyl-propionamide, N-vinyl-butyramide, N-vinyl-N-methyl-butyramide and N-vinyl-N-ethyl-butyramide. N-Vinyl-formamide is particularly suitable, and N-vinyl-N-methyl-acetamide is especially suitable. The N-vinyl-amides of the general formula I incorporate into the copolymer according to the invention units of the general formula VII

(VII)

wherein $R^1$ and $R^2$ have the meanings already given.

Of the polymerisable organosilicon or organoboron compounds, the polymerisable organosilicon compounds are preferred. Examples of suitable polymerisable organosilicon compounds are silanes, siloxanes and silanzanes containing polymerisable olefinic groups.

Examples of suitable polymerisable organosilicon and organoboron compounds are 3-(trimethoxy-silyl)-propyl acrylate or methacrylate, 3-(triethoxy-silyl)-propyl acrylate or methacrylate, 3-(tri(methoxyethoxy)-silyl)-propyl acrylate or methacrylate, 3-(tri(methoxyethoxy)-silyl)-propyl acrylate or methacrylate, 3-(di(methoxy)-methyl-silyl)-propyl acrylate or methacrylate, 3-(di-(ethoxy)-ethyl-silyl)-propyl acrylate or methacrylate, vinyl-tri-ethoxy-silane, vinyl-tri-methoxy-silane, vinyl-tri-allyloxysilane, allyl-tri-allyloxy-silane, vinyl-methyl-di-ethoxy-silane, vinyl-methyl-di-methoxy-silane, vinyl-tri-acetoxy-silane, vinyl-tri-(methoxyethoxy)-silane, 1,3-di-vinyl-1,1,3,3-tetra-methyl-di-siloxane, 1,3-di-vinyl-1,1,3,3,-tetra-methyl-disilazane, $CH_2=CH—COO—(CH_2)_3—(Si—(CH_3)_p—Si(CH_3)_2—(CH_3)_2—O—CO—CH=CH_2$, $CH_2=C(CH_3)—COO—(CH_2)_3—(Si(CH_3)_2—O)_p—Si(CH_3)_2—(CH_3)_2—O—CO—C(CH_3)=CH_2$, wherein p denotes a number from 1 to 20, in particular a number from 1 to 10, $CH_2=CH—CH_2—NH—SiH(CH_3)—N(CH_2CH=CH_2)—SiH(CH_3)—NH—CH_2—CH=CH_2$, triallyl borate and trimethallyl borate. The polymerisable organosilicon or organoboron compounds can, if the preconditions for this exist, also be used as n-valent crosslinking agents, or simultaneously as polymerisable organosilicon or organoboron compounds and crosslinking agents.

Other suitable polymerisable compounds are those which do not belong to any of the abovementioned groups and have only one polymerisable olefinic group in the molecule, and which can be incorporated in a small amount into the copolymer without substantially altering its properties, thus, for example, β-hydroxyethyl acrylate, β-hydroxyethyl methacrylate, styrene, acrylonitrile and methacrylonitrile.

The porous, bead-like copolymers according to the invention are prepared by bead polymerisation of 75 to 99.9% by weight of one or more pyridyl, quinolyl, isoquinolyl or pyrazinyl compounds containing a polymersible olefinic group, 0.1 to 25% by weight of one or more n-valent crosslinking agents and 0 to 25% by weight of one or more polymerisable organosilicon or organoboron compounds, and, based on 100% by weight of the sum of the abovementioned compounds, 5 to 350% by weight of one or more N-vinyl-amides of the formula I and 0 to 40% by weight of one or more other polymerisable compounds, n having the abovementioned meaning and it being possible for the pyridyl, quinolyl, isoquniolyl or pyrazinyl compound(s) also to be substituted, as already mentioned.

Preferably, 80 to 99% by weight of one or more pyridyl, quinolyl, isoquinolyl or pyrazinyl compounds containing a polymerisable olefinic group, 1 to 20% by weight of one or more n-valent crosslinking agents and 0 to 19% by weight of one or more polymerisable organosilicon and/or organoboron compounds, and, based on 100% of the sum of the abovementioned compounds, 10 to 250% by weight of one or more N-vinylamides of the general formula I and 0 to 25% by weight of units of another polymerisable compound or several such compounds, are employed in the copolymerisation.

Very particularly preferably, no compounds from the group of other polymerisable compounds and/or 0.1 to 10% by weight of one or more polymerisable organoboron and/or organosilicon compounds are employed in the copolymerisation.

Of the pyridyl, quinolyl, isoquinolyl or pyrazinyl compounds, the pyridyl compounds are preferably used, in particular vinyl-pyridines and particularly preferably 4-vinyl-pyridine. Up to 50% by weight of the pyridyl, quinolyl, isoquinolyl or pyrazinyl compound used in the copolymerisation can be replaced by one or more of the already mentioned heterocyclic 5-membered ring compounds with a polymerisable olefinic group and at least one protonatable nitrogen atom, in particular by 1-vinyl-imidazole.

The polymerisable monomers can as a rule be used here in their commercially available form, that is to say without prior purification.

The copolymerisation is carried out by the bead polymerisation process (compare, for example, Houben-Weyl: Methoden der organischen Chemie (Methods of Organic Chemistry), 4th edition, Volume 14, 1 (1961), Makromolekulare Stoffe (Macromolecular Substances), Part 1, page 406 et seq.). In the bead polymerisation, the monomer mixture to be polymerised is as a rule broken down to the desired bead size in water or another liquid in which the monomers and the copolymer formed are isoluble, by mechanical stirring or shaking, preferably also under the action of one or more suitable dispersing agents, and is then copolymerised. The copolymerisation is triggered off in a manner which is known per se, for example by UV light, high-energy radiation or, as a rule, by an initiator which is soluble in the monomer mixture and supplies free radicals. Examples of suitable initiators are benzoyl peroxide, tert.-butyl hydroperoxide, cymene peroxide, methyl ethyl ketone peroxide, lauroyl peroxide, tert.-butyl perbenzoate, tert.-butyl diperphthalate, azodiisobutyronitrile, 2,2'-azobis-(2,4-dimethylvaleronitrile), 2-phenyl-azo-2,4-dimethyl-4-methoxy-valeronitrile, 2-cyano-2-propyl-azo-formamide, azodiisobutyramide and dimethyl, diethyl or dibutyl azobis-methylvalerate. Based on the amount of monomer (including the crosslinking agent), about 0.01 to 2% by weight, preferably 0.1 to 1% by weight, of initiator is used.

Dispersing agents which are used are water-soluble or water-solubilised naturally occurring substances, in particular carbohydrates and proteins, for example solubilised starch, methyl starch, methylcellulose or other cellulose ethers, methylhydroxypropylcellulose, cellulose glycolate and furthermore cholesterol, saponin, size, tragacanth and the like, or water-soluble high molecular weight synthetic emulsifiers, such as, for example, polyvinyl alcohol, polyacrylates or polymethacrylates, in amounts of 0.05 to 3% by weight, preferably 0.1 to 1% by weight, based on the amount of water present.

It is advantageous to carry out the bead polymerisation in the presence of salts, such as, for example, sodium chloride or sodium nitrite, but in particular sodium formate, the salts being dissolved in the aqueous phase. It is furthermore advantageous to carry out the polymerisation in the absence of oxygen. This can be effected, for example, in a known manner by flushing with or passing through an inert gas, such as, for example, nitrogen. The bead polymerisation is usually carried out at temperatures from 45° to 95° C., preferably 55° to 85° C., and has as a rule ended after 0.3 to 3 hours. When the polymerisation has ended, the resulting bead-like copolymer is separated off, washed with water or an organic solvent and dried.

The crosslinked copolymer according to the invention is in the form of porous beads, the diameter of which can be varied as desired in the range from about 2 to 0.04 mm by choosing the preparation conditions. Under given preparation conditions, beads with a narrow diameter spectrum are obtained. The copolymer according to the invention is, in particular, in the form of beads with a diameter of 0.02 to 0.2 mm, preferably 0.02 to 0.1 mm, and is outstandingly suitable as a sorbent, in particular as a sorbent for acid substances from solvents. Acid substances in the context of the present invention are understood as meaning those substances of the general formula HA which can dissociate into $LmH^+$ and an acid radical $A^-$ in a solvent of the general formula Lm (as a rule water or a water-containing solvent mixture). Examples of such acid substances are carboxylic acids, sulphonic acids, mineral acids, thiocarboxylic acids, phenols, thiophenols, mercapstans, acid imides and acid sulphimides. The acid organic substances mentioned can also be substituted and/or contain several identical or different acid groups in the molecule.

Examples of suitable aliphatic and aromatic mono-, di- and poly-carboxylic acids, hydroxycarboxylic acids and ketocarboxylic acids are formic acid, acetic acid, propionic acid, n-butyric acid, i-butyric acid, n-valeric acid, trimethylacetic acid, caproic acid, n-heptylic acid, caprylic acid, capric acid, pelargonic acid, stearic acid, tallow fatty acid, fluoroacetic acid, chloroacetic acid, bromoacetic acid, iodoacetic acid, dichloroacetic acid, 2-chloropropionic acid, glycollic acid, lactic acid, methoxyacetic acid, thioglycollic acid, cyanoacetic acid, glyoxylic acid, malonic acid, acrylic acid, methacrylic acid, vinylacetic acid, phenylacetic acid, oxalic acid, succinic acid, glutaric acid, adipic acid, maleic acid, fumaric acid, phthalic acid, isophthalic acid, terephthalic acid, citric acid, malic acid, benzilic acid, aconitic acid, trimesic acid, benzoic acid, cinnamic acid, mandelic acid, tartaric acid, salicylic acid, acetoacetic acid, hydroxybenzoic acid, gallic acid and dihydroxybenzoic acid. 6-Aminopenicillanic acid and 7-aminocephalosporanic acid, for example, are also suitable.

Examples of suitable mineral acids are sulphuric acid, phosphoric acid, phosphorous acid and hydrochloric acid.

The copolymers according to the invention are also particularly suitable for the sorption of sulphonic acids, such as, for example, benzenesulphonic acid or naphthalene-1- or -2-sulphonic acid or naphthalene- or benzene-di- or -poly-sulphonic acids, and in particular also for the sorption of substituted sulphonic acids, for example of the benzene, naphthalene and anthraquinone series, such as are used in some cases in the manufacture of dyestuffs, in particular azo dyestuffs. Such sulphonic acids can be, for example, mono-, di- or tri-sulphonic acids and can be mono- or poly-substituted, for example by hydroxyl, amino, carboxyl, halogen, nitro or alkyl with 1 to 4 C atoms. Such sulphonic acids are known in some cases in the dyestuff industry under their trivial or discoverer names or under alpha-numerical designations (= "Letter acids"). However, such sulphonic acids are given under their systematic names in the following selection of examples of suitable sulphonic acids: 3-methyl-benzenesulphonic acid, benzene-1,3-disulphonic acid, methylbenzene-2,4-disulphonic acid, 2,4-dimethyl-benzenesulphonic acid, 2,5-dimethyl-benzenesulphonic acid, 2,6-dimethyl-4-tert.-butyl-benzenesulphonic acid, hydrindene-5-sulphonic acid, benzaldehyde-2,4-disulphonic acid, 4-chloro-benzenesulphonic acid, 2,5-dichloro-benzenesulphonic acid, 2-amino-benzensulphonic acid, 3-amino-benzenesulphonic acid, aminobenzene-2,5-disulphonic acid, 1,3-diaminobenzene-4-sulphonic acid, 1,3-diaminobenzene-4,6-disulphonic acid, 1,4-diaminobenzene-2,5-disulphonic acid, 2-amino-5-methyl-benzenesulphonic acid, 2-amino-3,5-dimethyl-benzenesulphonic acid, 2-amino-4-sulphobenzoic acid, 2-amino-5-sulphobenzoic acid, 2-isobutylamino-5-sulphobenzoic acid, 2-hydroxy-5-sulphobenzoic acid, 2-aminophenyl-4-sulphonic acid, 3-amino-4-methoxy-benzenesulphonic acid, 2-aminophenol-4,6-disulphonic acid, 2-amino-5-chlorobenzenesulphonic acid, 3-amino-4-chlorobenzenesulphonic acid, 2-amino-4,5-dichloro-benzenesulphonic acid, 4-amino-2,5-dichlorobenzene-sulphonic acid, 2-amino-5-chloro-4-methylbenzenesulphonic acid, 3-amino-5-chloro-4-methylbenzenesulphonic acid, 4-amino-5-chloro-3-methylbenzenesulphonic acid, 5-amino-4-chloro-3-methylbenzenesulphonic acid, anthraquinone-1-sulphonic acid, anthraquinone-2-sulphonic acid, anthraquinone-1,5-or -1,8-disulphonic acid, anthraquinone-2,6- or -2,7-disulphonic acid, 2-, 4-, 5- or 7-hydroxy-naphthalene-1-sulphonic acid, 6- or 7-hydroxy-naphthalene-2-sulphonic acid, 4- or 7-hydroxy-naphthalene-1,5-disulphonic acid, 4- or 8-hydroxy-naphthalene-1,6-disulphonic acid, 7-hydroxy-naphthalene-1,3-disulphonic acid, 3-, 4-or 5-hydroxy-naphthalene-2,7-disulphonic acid, 4-hydroxy-naphthalene-2,5-disulphonic acid, 6-hydroxy-naphthalene-1,4-disulphonic acid, 6-hydroxy-naphthalene-1,7-disulphonic acid, 2-, 4-, 5-, 6-, 7- or 8-amino-naphthalene-1-sulphonic acid, 4-, 5-, 6-, 7- or 8-amino-naphthalene-2-sulphonic acid, 6- or 7-amino-naphthalene-1,3-disulphonic acid, 3- or 4-amino-naphthalene-1,5-disulphonic acid, 4- or 8-amino-naphthalene-1,6-disulphonic acid, 4-amino-naphthalene-1,7-disulphonic acid, 4-amino-naphthalene-2,6-disulphonic acid, 1-, 3- or 4-amino-naphthalene-2,5-disulphonic acid, 8-amino-naphthalene-1,3,6-trisulphonic acid, 7-amino-naphthalene-1,3,5-trisulphonic acid, 4-amino-naphthalene-1,5,7-trisulphonic acid, 4-amino-naphthalene-2,5,7-trisulphonic acid, 4-amino-3- or -5-hydroxy-naphthalene-1-sulphonic acid, 6-, 7- or 8-amino-4-hydroxynaphthalene-2-sulphonic acid, 2- or 4-amino-5-hydroxy-naphthalene-1,7-disulphonic acid, 4-amino-5-hydroxy-naphthalene-1,3-disulphonic acid, 3- or 4-amino-5-hydroxy-naphthalene-2,7-disulphonic acid, 4,6- or 6,7-dihydroxy-naphthalene-2-sulphonic acid, naphthalene-1,5-, -1,6-, -2,7-, -2,5-, -3,6- or -2,6-disulphonic acid, naphthalene-1,5,7- or -2,5,7-trisulphonic acid, 4-hydroxy-naphthalene-2,5,7-trisulphonic acid, 4,5-dihydroxy-naphthalene-2,7-disulphonic acid and 4-hydroxy-7-phenylamino-naphthalene-2-sulphonic acid.

Acid salts of sulphonic acids, in particular acid sodium or ammonium salts, such as, for example, the Na salt of 6,7-dihydroxy-naphthalene-2-sulphonic acid, so-called G salt (Na salt of 6-hydroxy-naphthalene-2,4-disulphonic acid) and so-called R salt (Na salt of 6-hydroxy-naphthalene-2,7-disulphonic acid) can also be sorbed.

Other compounds which are suitable are: thiophenol, m-thiocresol, 2-bromothio-p-cresol, ethanethiol, phenylmethanethiol, 1,4-butanedithiol, 4-mercapto-2-pyridine-carboxylic acid, 2,3-dimercapto-succinic acid, dithioacetic acid, thioacetic O-acid, thioacetic S-acid, phthalimide, succinimide and benzenesulphimide.

In the presence of mineral acids, sulphonic acids are preferentially sorbed by the copolymers according to the invention. The copolymers according to the invention are also suitable for the selective sorption of heavy metal ions, such as, for example, zinc, copper or mercury ions, from aqueous solutions, in particular also from extremely dilute aqueous solutions. The copolymers according to the invention are preferably suitable for the sorption of carboxylic acids, in particular from their aqueous solutions.

In the sorption of carboxylic acids, the copolymers according to the invention have an at least 100% higher sorption capacity than the exchangers according to German Pat. No. C2-3,043,766, and at the same time a lower swelling capacity in solvents. The sorption is carried out in a manner which is known per se. As a rule, the column or fixed bed method is used, in which the sorbent is filled into a column, through which the solvent containing one or more acid substances then flows until the capacity of the exchanger is exhausted. Desorption of the sorbed acid substances is then likewise carried out in a manner which is known per se, thus, for example, with alkalis or, preferably, with the aid of organic solvents, such as, for example, an alcohol, such as methanol, ethanol, i-propanol or n-butanol, a ketone, such as acetone, methyl ethyl ketone or diethyl ketone, an ester, such as methyl or ethyl acetate, acetic acid ethylglycol ester or acetic acid ethyldiglycol ester, or an ether, such as, for example, tetrahydrofuran, dioxane, ethylene glycol dimethyl ether or ethylene glycol diethyl ether. The desorbed acid substances can be put to use elsewhere.

The sorption and desorption of acid substances with the aid of polymers according to the invention can also be carried out by other known sorption processes, such as, for example, by a continuous process with a moving bed, by the fluidised bed method or by batchwise operation.

The heavy metal ions are likewise sorbed on the adsorber resins according to the invention and desorbed in a manner which is known per se.

For example, the sorption of acid substances and, in particular, the desorption of acid substances by means of organic solvents is improved in the case of the copolymers according to the invention by a content of one or more N-vinyl-amides of the formula I. This improvement is particularly considerable with di- and poly-carboxylic acids, with aldehyde- and keto-carboxylic acids, and with higher contents of one or more N-vinyl-amides of the formula I.

The percentages given in the examples which follow are percentages by weight.

EXAMPLE 1

(a) 50 g of 4-vinyl-pyridine, 5 g of N-vinyl-N-methyl-acetamide and 5 g of pentaerythritol triacrylate are dissolved together with 0.22 g of dibenzoyl peroxide, and are dissolved, whilst passing through nitrogen and stirring. The resulting monomer mixture is then introduced into a solution of 300 ml of water, 37.5 g of sodium formate and 37.5 g of a 1% strength aqueous hydroxyethylcellulose solution, with stirring. The mixture is then heated, with continuous stirring and while passing through nitrogen, the polymerisation starting at 60° C. Polymerisation is brought to completion at 80° C. in the course of 1 hour. The resulting highly crosslinked porous bead-like copolymer is washed with water and dried.

The yield is 54 g (about 90% of theory).

(b) An equally good polymer with a porous and crosslinked structure is obtained if 5 g of pentaerythritol trimethacrylate are used instead of pentaerythritol triacrylate.

In this example and in the following examples, the commercial product "Tylose H 30 000 yp" from Hoechst AG, Frankfurt am Main 80, is used for the preparation of the hydroxyethylcellulose solution.

EXAMPLE 2

87.5 g of 4-vinyl-pyridine, 22.5 g of N-vinyl-N-methylacetamide and 10 g of trimethylolpropane trimethacrylate are stirred together with 0.44 g of dibenzoyl peroxide, the mixture is introduced into a solution of 600 ml of water, 75 g of sodium formate and 75 g of a 1% strength aqueous hydroxyethylcellulose solution, while continuously passing through nitrogen and continuously stirring the mixture is warmed to 60° to 65° C., whereupon the copolymerisation starts, and the polymerisation is brought to completion in the course of 1 hour. The resulting bead-like copolymer has a porous structure and is washed with water and dried.

The yield is 105 g.

EXAMPLE 3

(a) 195 g of 4-vinyl-pyridine, 80 g of N-vinyl-formamide, 25 g of trimethylolpropane triacrylate and 1.1 g of dibenzoyl peroxide are dissolved at room temperature and the solution is added to a solution of 1,500 ml of water, 187.5 g of sodium formate and 187.5 g of a 1% strength hydroxyethylcellulose solution, while continuously passing through nitrogen and stirring. The mixture is then heated to 65° to 70° C. and the polymerisation is brought to completion in the course of 2 hours. The resulting porous bead-like copolymer is separated off, washed with methanol and dried. The yield is 285 g.

(b) A porous bead-like copolymer with an equally good surface structure is obtained if, instead of 195 g of 4-vinyl-pyridine, the same amount of 2-vinyl-pyridine is used.

EXAMPLE 4

25 g of 4-vinyl-pyridine, 25 g of N-vinyl-N-methylacetamide, 10 g of trimethylolpropane triacrylate and 0.176 g of dibenzoyl peroxide are dissolved at room temperature, the solution is added to a solution of 300 ml of water, 37.5 g of sodium formate and 37.5 g of a 1% strength hydroxyethylcellulose solution, with continuous stirring, the mixture is warmed to 60° to 65° C. and the polymerisation is brought to completion in the course of 2 hours. The bead-like copolymer formed, with a well-structured porous surface, is washed with methanol and dried. The yield is 58 g.

A porous bead-like copolymer of the same surface structure is obtained if the stated amount of 4-vinyl-pyridine is replaced by 2-vinyl-6-methylpyridine.

EXAMPLE 5

(a) 45 g of 4-vinyl-pyridine, 5 g of 1,7-bis-(3-hydroxypropyl)-1,1,3,3,5,5,7,7-octamethyltetrasiloxane bis-acrylate and 10 g of N-vinyl-formamide are dissolved together with 0.22 g of dibenzoyl peroxide and the solution is added to a solution of 300 ml of water, 37.5 g of sodium formate and 37.5 g of a 1% strength aqueous hydroxyethylcellulose solution, while continuously passing through nitrogen and stirring. The mixture is then heated to 70° C. and polymerisation is carried out for 1 hour. The resulting copolymer is washed with water and then digested with methanol and separated off. The yield is 55 g.

(b) An equally good, highly crosslinked copolymer is obtained if, instead of 1,7-bis-(3-hydroxypropyl)-1,1,3,3,5,5,7,7-octamethyltetrasiloxane bis-acrylate, the same amount of 3-triethoxysilylpropyl methacrylate is used.

EXAMPLE 6

(a) 22 g of 4-vinylpyridine, 33 g of N-vinyl-N-methylacetamide and 5 g of triallyl borate are dissolved together with 0.22 g of dibenzoyl peroxide and the solution is added to a solution of 300 ml of water, 37.5 g of sodium formate and 37.5 g of a 1% strength aqueous hydroxyethylcellulose solution, while continuously passing through nitrogen and continuously stirring. The mixture is then heated to 60° C. and polymerisation is carried out for 1 hour. The resulting porous bead-like copolymer is separated off, washed with methanol and dried. The yield is 57.5 g.

(b) Equally good porous bead-like copolymers are obtained if, instead of 5 g of triallyl borate, the same amount of trimethallyl borate is used.

EXAMPLE 7

40 g of 4-vinyl-quinoline, 15 g of N-vinyl-formamide and 5 g of pentaerythritol triacrylate are dissolved together with 0.22 g of dibenzoyl peroxide, the solution is added to 500 ml of toluene, while passing through nitrogen and stirring, and copolymerisation is carried out at 80° C. The highly crosslinked porous bead-like copolymer is washed with toluene and dried. The yield is 55 g.

A product with equally good properties is obtained if the stated amount of 40 g of 4-vinyl-quinoline is replaced by 4-vinylisoquinoline.

EXAMPLE 8

49.5 g of 4-vinyl-pyridine, 5.5 g of N-vinyl-formamide, 5 g of N-vinyl-N-methylacetamide and 5 g of trimethylolpropane trimethacrylate are dissolved together with 0.22 g of dibenzoyl peroxide and the solution is added to a solution of 300 ml of water, 37.5 g of sodium formate and 37.5 g of a 1% strength aqueous hydroxyethylcellulose solution, while passing through nitrogen and continuously stirring. The mixture is then heated to 70° to 75° C. and polymerisation is brought to completion in the course of 1 hour. The resulting porous bead-like polymer has a porous surface structure and is filtered off with suction, digested with methanol and dried.

The yield is: 60 g.

A product with an equally good surface structure is obtained if, instead of 5 g of N-vinyl-N-methylacetamide, 5 g of N-vinyl-N-ethylacetamide are used.

EXAMPLE 9

To determine the adsorption capacity, 50 g of copolymer are packed into a glass column with an internal diameter of 25 mm, and a 1% strength aqueous D-lactic acid solution is passed through at a rate of 1.8 bed volumes/hour, until the runnings are acid. For desorption of the lactic acid, 650 ml of methanol are passed through the column at a rate of 1.8 bed volumes/hour and the D-lactic acid in the eluate is determined quantitatively by an enzymatic method with lactate dehydrogenase.

On using various copolymers, the adsorption values shown in the following table are obtained.

| Copolymer according to Example | Capacity in g of D-lactic acid/ 100 g of copolymer |
| --- | --- |
| 1a | 22 |
| 3a | 25 |
| 5a | 74 |
| 5b | 76 |
| 6a | 54 |
| 1 of German Patent C2-3,043,766 | 8 |

In the same manner, using the new copolymers according to the invention, it is possible to sorb, for example, formic acid, acetic acid, propionic acid, n-butyric acid, i-butyric acid, valeric acid, caproic acid, capric acid, glycollic acid, malic acid, malonic acid, succinic acid, oxalic acid, glutaric acid, adipic acid, maleic acid, fumaric acid, citric acid, tricarballylic acid, tartaric acid, glyoxylic acid and phenols, and then to elute these compounds again with solvents, such as, for example, acetone, methanol, ethyl acetate, tetrahydrofuran, dioxane or dimethoxyethane.

EXAMPLE 10

2 g of the product according to Example 5b are suspended in a water/methanol mixture (volume ratio 1:1) and the suspension is introduced into a glass column with a diameter of 1.5 cm. The filling is washed with 500 ml of water.

An aqueous solution of $ZnCl_2$ with a pH value of 2 and containing $10^{-6}$ g/ml is then introduced onto the column and the $Zn^{++}$ ion content is determined in the individual fractions of the runnings. In the first 1,280 ml of the runnings, the content of $Zn^{++}$ ions is below $10^{-8}$ g/ml, and then increases to $1.2 \times 10^{-7}$ g/ml.

EXAMPLE 11

49.5 g of 4-vinyl-pyridine, 40.5 g of N-vinylimidazole, 20 g of N-vinyl-N-methylacetamide and 10 g of trimethylolpropane triacrylate, together with 0.44 g of dibenzoyl peroxide are added, after being dissolved, to a solution of 600 ml of water, 75 g of sodium formate and 75 g of a 1% strength aqueous hydroxyethylcellulose solution, while passing through nitrogen and continuously stirring. The mixture is then heated to 70° to 71° C. and the polymerisation is brought to completion in the course of 1 hour.

The resulting bead-like polymer has a porous surface structure. It is separated off, washed with methanol and dried. The yield is 115 g.

We claim:

1. Crosslinked bead-like porous copolymer containing 75 to 99.9% by weight of recurring units of a pyridyl, quinolyl, isoquinolyl or pyrazinyl compound containing a polymerisable olefinic group or of several such compounds, 0.1 to 25% by weight of units of an n-valent polyunsaturated crosslinking agent or of several n-valent polyunsaturated crosslinking agents and 0 to 25% by weight of units of a polymerisable organisilicon and/or organoboron compound or of several such compounds and, based on 100% by weight of the sum of the above-mentioned units, 5 to 350% by weight of units of an N-vinyl-amide of the general formula I $CH_2=CH-N(R^1)-C(R^2)=0$, wherein $R^1$ denotes hydrogen, methyl or ethyl and $R^2$ denotes hydrogen or $(C_1-C_3)$-alkyl, or of several such N-vinyl-amides, and 0 to 40% by weight or units of another polymerisable compound or of several such com-pounds, n being a number equal to or greater than 2 and it being possible for the pyridyl, quinolyl, isoquinolyl or pyrazinyl compound also additionally to have one other or several other substituents.

2. Copolymer according to claim 1, containing 80 to 99% by weight of recurring units of a pyridyl, quinolyl, isoquinolyl or pyrazinyl compound containing a polymerisable olefinic group or of several such compounds, 1 to 20% by weight of units of an n-valent crosslinking agent or of several n-valent crosslinking agents, and 0 to 19% by weight of units of a polymerisable organosilicon and/or organoboron compound or of several such compounds, and, based on 100% by weight of the sum of the abovementioned units, 10 to 250% by weight of units of an N-vinyl-amide of the general formula I or of several such N-vinyl-amides, and 0 to 255 by weight of units of another polymerisable compound or of several such compounds.

3. Copolymer according to claim 1 or 2, characterised in that it contains 0.1 to 10% by weight of units of a polymerisable organoboron and/or organosilicon compound.

4. Copolymer according to claim 1 or 2, characterised in that it contains no units of other polymerisable compounds.

5. Copolymer according to claim 1 or 2, characterised in that it contains recurring units of vinylpyridine.

6. Copolymer according to claim 1 or 2, characterised in that up to 50% by weight of the units of the pyridyl, quinolyl, isoquinolyl or pyrazinyl compound can be replaced by units of a heterocyclic 5-membered ring compound which contains a polymerisable olefinic group and has at least one protonatable nitrogen atom in the ring, or of several such compounds.

7. Process for the preparation of the crosslinked copolymers described in claim 1 or 2 characterised in that 75 to 99.9% by weight of one or more pyridyl, quinolyl, isoquinolyl or pyrazinyl compounds containing a polymerisable olefinic group, 0.1 to 25% by weight of one or more n-valent polyunsaturated crosslinking agents and 0 to 255 by weight of one or more polymerisable organosilicon and/or organoboron compounds, and, based on 100% by weight of the sum of the above-mentioned compounds, 5 to 350% by weight of one or more N-vinyl-amides of the formula I and 0 to 40% by weight of one or more other polymerisable compounds, n being a number equal to or greater than 2, are copolymerised.

8. Process according to claim 7, characterised in that 80 to 99% by weight of a pyridyl, quinolyl, isoquinolyl or pyrazinyl compound containing a polymerisable olefinic group, or of several such compounds, 1 to 20% by weight of a crosslinking agent or of several such crosslinking agents, 0 to 19% by weight of one or more polymerisable organoboron and/or organosilicon compounds and, based on 100% of the sum of the above-mentioned compounds, 10 to 250% by weight of one or more N-vinyl-amides of the general formula I and 0 to 25% by weight of units of another polymerisable compound or several such compounds, are copolymerised.

9. Process according to claim 7 or 8, characterised in that no compounds from the group of other polymerisable compounds are used in the copolymerisation.

10. Process according to claim 7 or 8, characterised in the 0.1 to 10% by weight of a polymerisable organoboron and/or organosilicon compound is used.

11. Process according to claim 7 or 8, characterised in that up to 50% by weight of the pyridyl, quinolyl, isoquinolyl or pyrazinyl compound is replaced by a heterocyclic 5-membered ring compound with a polymerisable olefinic group and at least one protonatable nitrogen atom in the ring, or by several such compounds.

* * * * *